United States Patent
Ou Yang et al.

(10) Patent No.: US 6,797,044 B2
(45) Date of Patent: Sep. 28, 2004

(54) AIR FILTER DEVICE

(76) Inventors: Chieh Ou Yang, No. 22, Alley 47, Lane 115, Sec. 2, Cheng Kung Rd., Taipei (TW); Wei Ou Yang, No. 24, Alley 47, Lane 115, Sec. 2, Cheng Kung Rd., Taipei (TW)

( * ) Notice: Subject to any disclaimer, the term of this patent is extended or adjusted under 35 U.S.C. 154(b) by 0 days.

(21) Appl. No.: 10/308,022

(22) Filed: Dec. 3, 2002

(65) Prior Publication Data

US 2004/0103790 A1 Jun. 3, 2004

(51) Int. Cl.[7] .............................................. B01D 50/00
(52) U.S. Cl. ....................... 96/224; 55/385.6; 55/471; 55/481; 422/121; 422/186.3
(58) Field of Search .................. 96/223, 224; 55/385.6, 55/467, 471, 481; 422/121, 186.3

(56) References Cited

U.S. PATENT DOCUMENTS

| | | | |
|---|---|---|---|
| 3,072,978 A | * | 1/1963 | Minto .......................... 96/224 |
| 3,750,370 A | * | 8/1973 | Brauss et al. .................. 96/140 |
| 5,837,207 A | * | 11/1998 | Summers ..................... 422/121 |
| 6,462,947 B1 | * | 10/2002 | Huang ......................... 361/695 |
| 6,464,760 B1 | * | 10/2002 | Sham et al. ................ 96/117.5 |
| 2001/0043887 A1 | * | 11/2001 | Morneault et al. .......... 422/121 |

FOREIGN PATENT DOCUMENTS

JP      2001314491 A    * 11/2001

* cited by examiner

Primary Examiner—Robert A. Hopkins
(74) Attorney, Agent, or Firm—Rosenberg, Klein & Lee

(57) ABSTRACT

An air filter device is installed on an exhaust device. The air filter device includes a filter net and one or more ultraviolet light-emitting diodes (UV LEDs). The filter net is disposed at an air passageway of the exhaust device. The UV LED is disposed on the exhaust device and located at one side of the filter net to irradiate UV light toward the filter net, hence accomplishing filtering and sterilizing effects to the air passing through the exhaust device and thus improving the quality of indoor air.

7 Claims, 10 Drawing Sheets

US 6,797,044 B2

AIR FILTER DEVICE

FIELD OF THE INVENTION

The present invention relates to an air filter device and, more particularly, to an air filter device applicable to various kinds of exhaust devices to provide air of good quality.

BACKGROUND OF THE INVENTION

Nowadays, exhaust devices are commonly used as ideal electric appliances for air exchange, preservation of freshness of indoor air, and heat radiation of other electric appliances. Exhaust devices generally include exhaust fans used in kitchen, heat-radiating fans in heaters, cooling fans in air conditioner and computer housings, and so on. Generally speaking, there is no structure or device for filtering air installed in a conventional exhaust device. External air is extracted in via an intake of the exhaust device for enhancing flow of air, temperature reduction, and heat radiation. There is no filtering and sterilizing function to the air passing through the exhaust device. Therefore, disease media like dusts or bacteria cannot be eliminated to improve the quality of indoor air.

Accordingly, the above conventional exhaust device has inconvenient and drawbacks in practical use. The present invention aims to resolve the problems in the prior art.

SUMMARY OF THE INVENTION

The primary object of the present invention is to provide an air filter device, which is installed on an exhaust device to accomplish filtering and sterilizing effects to air passing through the exhaust device, hence improving the quality of indoor air.

Another object of the present invention is to provide an air filter device applicable to various kinds of exhaust devices, which are installed in cars, bathrooms, toilets, refrigerators, or computers to continuously provide fresh air for users, or can apply to small vertical fans to accomplish filtering and sterilizing effects at the same time of reducing ambient temperature.

To achieve the above primary object, the present invention provides an air filter device installed on an exhaust device. The air filter device comprises a filter net and one or more ultraviolet (UV) light-emitting diodes (LEDs). The filter net is disposed at the air passageway of the exhaust device. The UV LED is disposed on the exhaust device and located at one side of the filter net to irradiate UV light toward the filter net.

To achieve the above another object, the present invention provides an air filter device installed on an exhaust device, which can be a common exhaust fan, a heat-radiating fan, a cooling fan, or a small vertical fan.

The various objects and advantages of the present invention will be more readily understood from the following detailed description when read in conjunction with the appended drawing, in which:

DETAILED DESCRIPTION OF THE PREFERRED EMBODIMENTS

Figure 1:
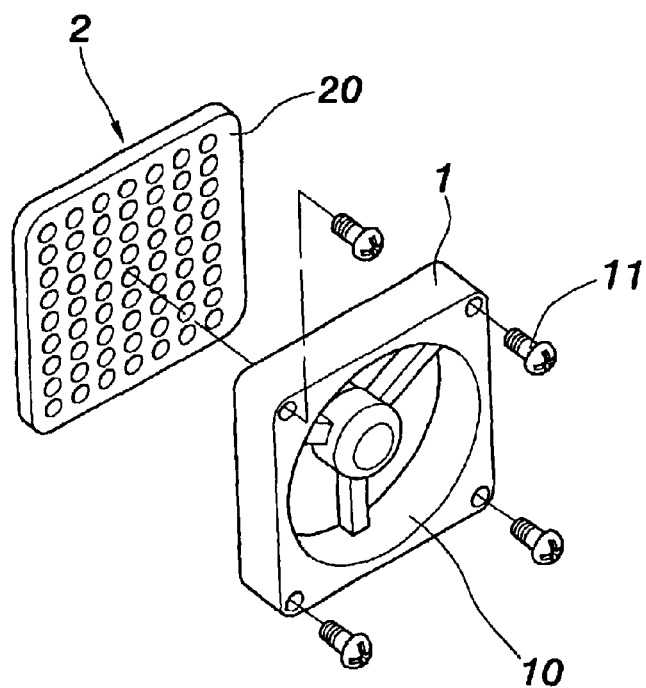
FIG. 1 is an exploded perspective view of a first embodiment of the present invention.
Figure 2:
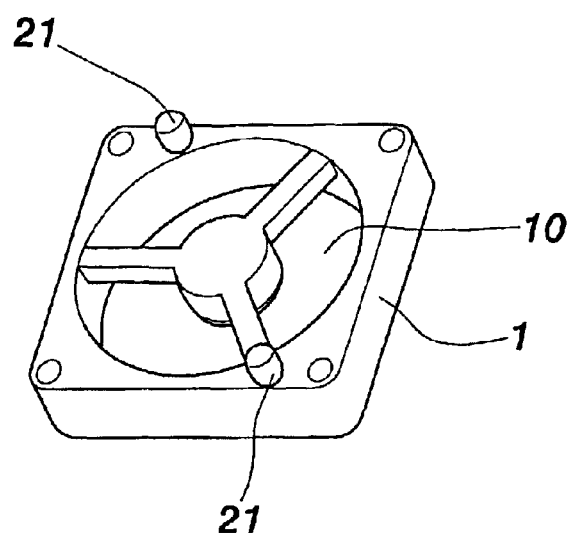
FIG. 2 is a perspective assembly view of the first embodiment of the present invention.
Figure 3:
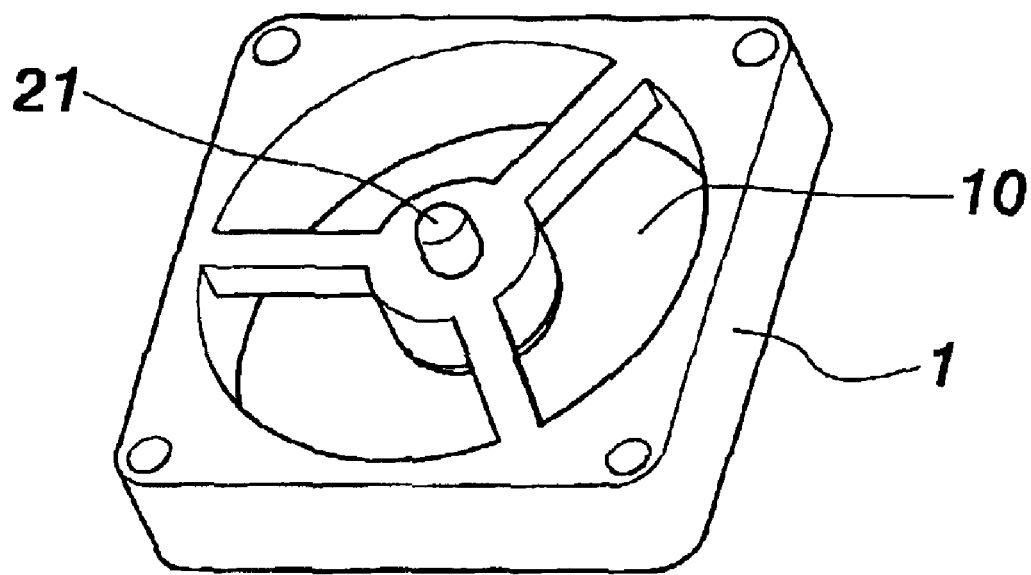
FIG. 3 is a perspective assembly view of a UV LED disposed at the center of an exhaust device according to the first embodiment of the present invention.
Figure 3A:
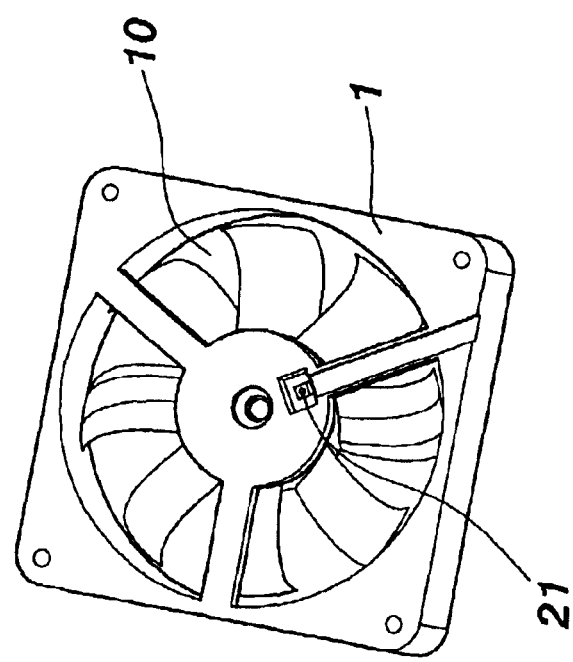
FIG. 3A is another perspective assembly view of a UV LED disposed at the center of an exhaust device according to the first embodiment of the present invention.
Figure 3B:
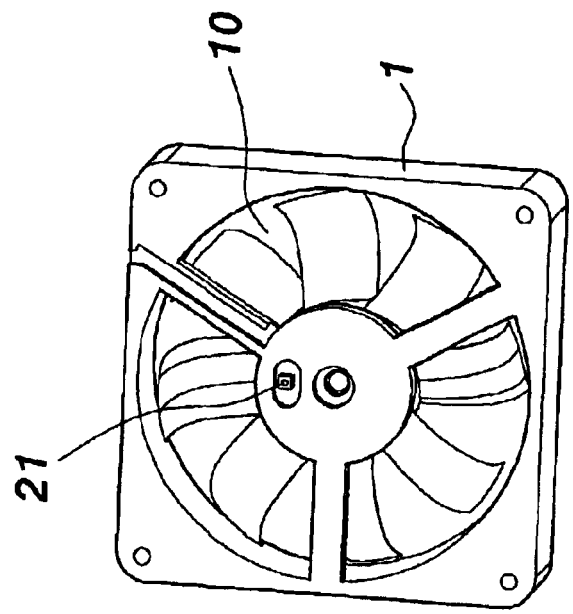
FIG. 3B is yet another perspective assembly view of a UV LED disposed at the center of an exhaust device according to the first embodiment of the present invention.

As shown in FIGS. 1 and 2, the present invention provides an air filter device 2 installed on an exhaust device 1. In this embodiment, the exhaust device 1 is a common exhaust fan having an air passageway 10. The air filter device 2 is installed on the exhaust device 1, and comprises a filter net 20 and one or more UV LEDs 21. The filter net 20 is fixedly disposed at the air passageway 10 of the exhaust device 1. The UV LED 21 is disposed on the exhaust device 1 and located at one side of the filter net 20, and irradiates UV light toward the filter net 20 to accomplish filtering and sterilizing effects. The above UV LED 21 can be disposed at the upper or lower edge of the exhaust device 1 (as shown in FIG. 2), or can be disposed at the center of a fan blade of the exhaust device 1 (as shown in FIGS. 3, 3A, and 3B).

Figure 4:
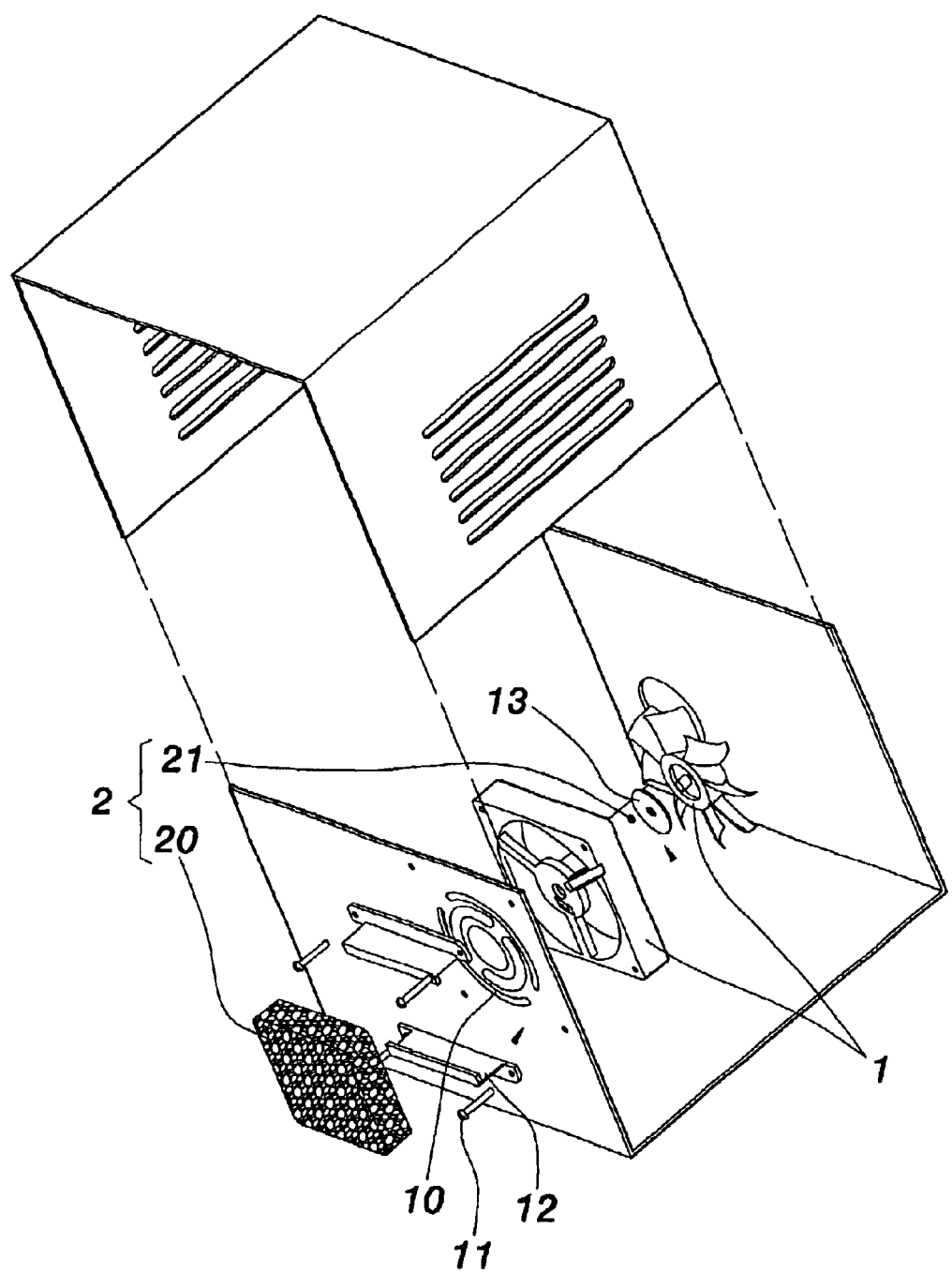
FIG. 4 is an exploded perspective view of a second embodiment of the present invention.

As shown in FIG. 4, the exhaust device 1 is a common heat-radiating fan in a computer housing. The exhaust device 1 also has an air passageway 10. A fixing insertion slot 12 is disposed outside the air passageway 10 so that the filter net 20 of the air filter device 2 can be installed thereon and fixed with screws 11. The UV LED 21 is fixedly disposed on a PC board 13 of a drive shaft of the heat-radiating fan, and irradiates UV light toward the filter net 20 to accomplish filtering and sterilizing effects.

Figure 5:
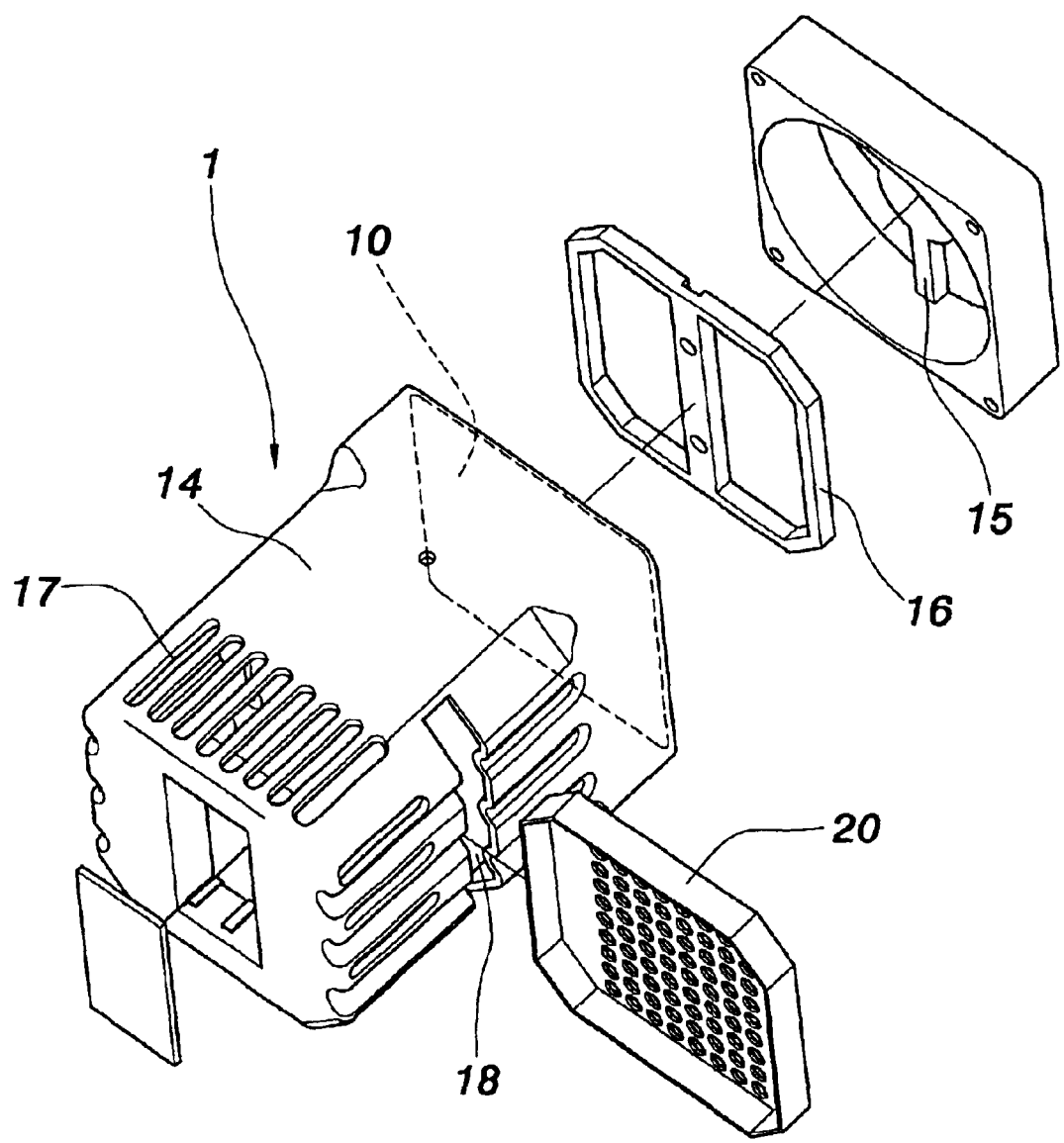
FIG. 5 is an exploded perspective view of a third embodiment of the present invention.

As shown in FIG. 5, the exhaust device 1 comprises a fan body 14, a fan blade 15, and a fixing holder 16. The fan body 14 is a box body with an open end to be connected with the fixing holder 16. A plurality of ventilation holes 17 are formed at the other end of the fan body 14. The fan body 14 has a hollow inside to form the air passageway 10. The fan blade 15 is fixed on the fixing holder 16 and located in the air passageway 10. An insertion slot 18 intersecting with the air passageway 10 is formed at the middle section of the fan body 14. The filter net 20 is inserted into the insertion slot 18 to facilitate extraction of the filter net 20 for cleaning or replacement.

Figure 6:
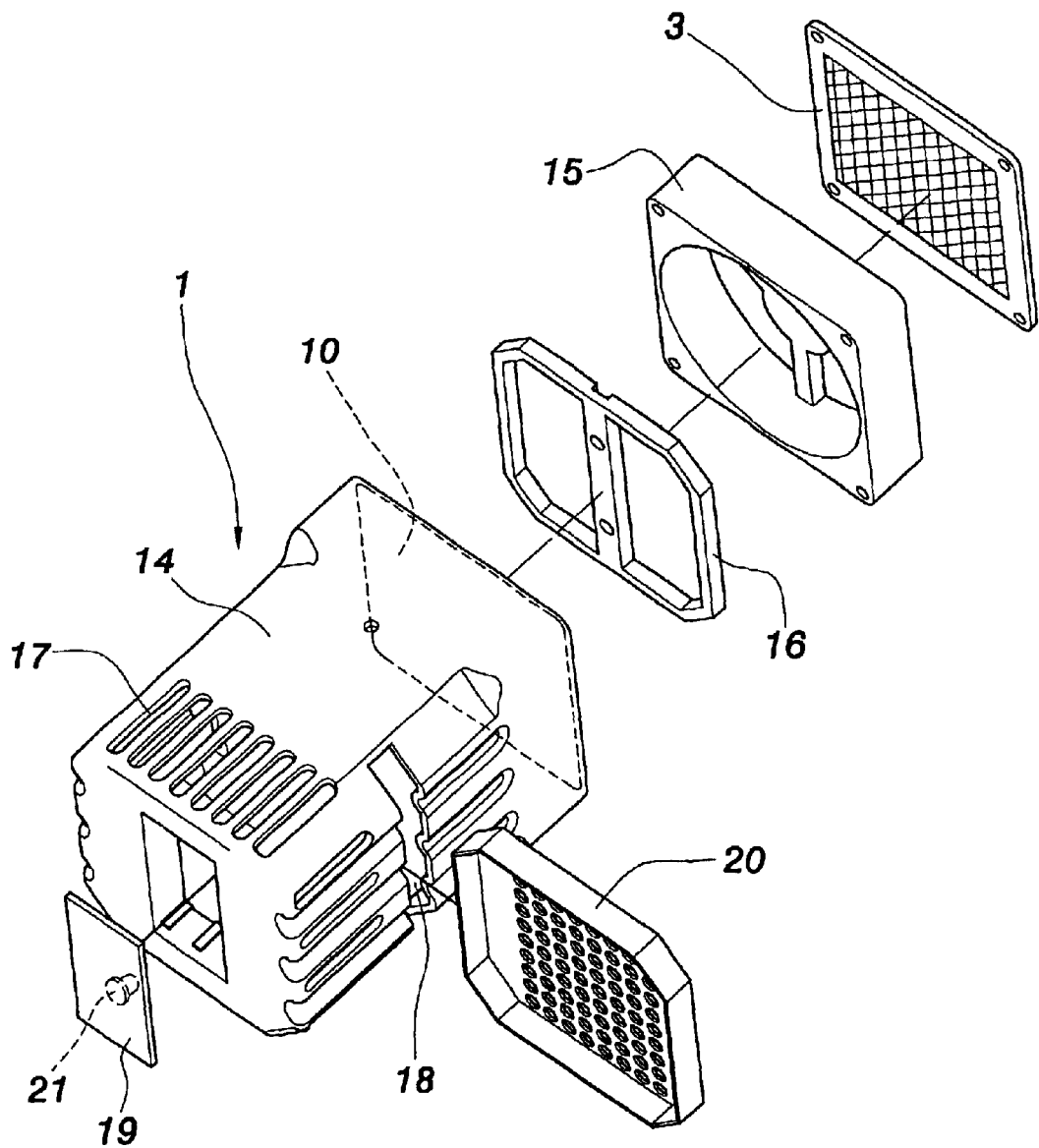
FIG. 6 is an exploded perspective view of a fourth embodiment of the present invention.
Figure 7:
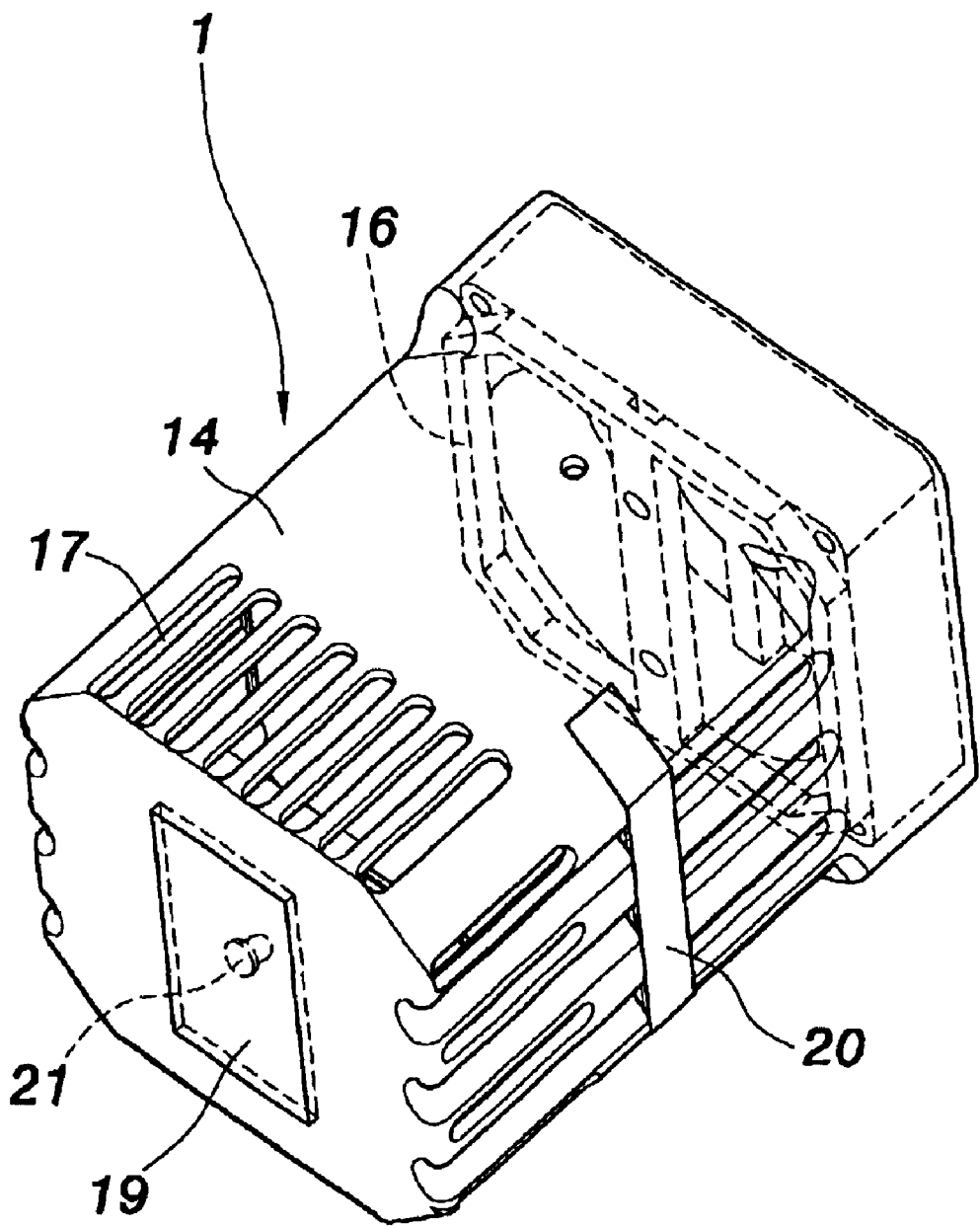
FIG. 7 is a perspective assembly view of the fourth embodiment of the present invention.

As shown in FIGS. 6 and 7, different from the third embodiment shown in FIG. 5, a safety net 3 is provided at the rear end of the fan blade 15 for filtering air and also preventing fingers from touching the fan blade 15. A fixing board 19 can also be installed at the front end of the fan body 14 so that the UV LED 21 can be installed thereon.

Figure 8:
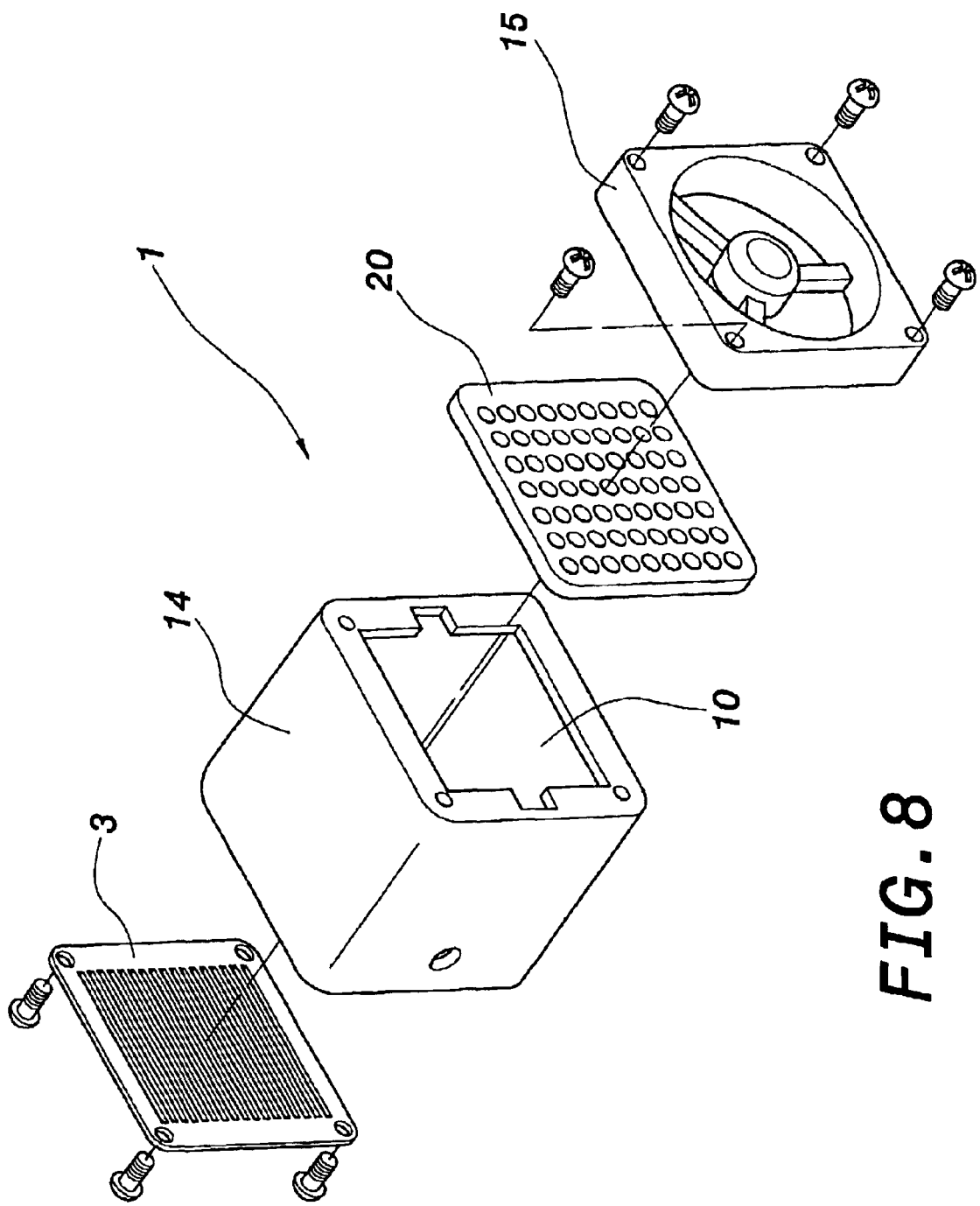
FIG. 8 is an exploded perspective view of a fifth embodiment of the present invention.
Figure 9:
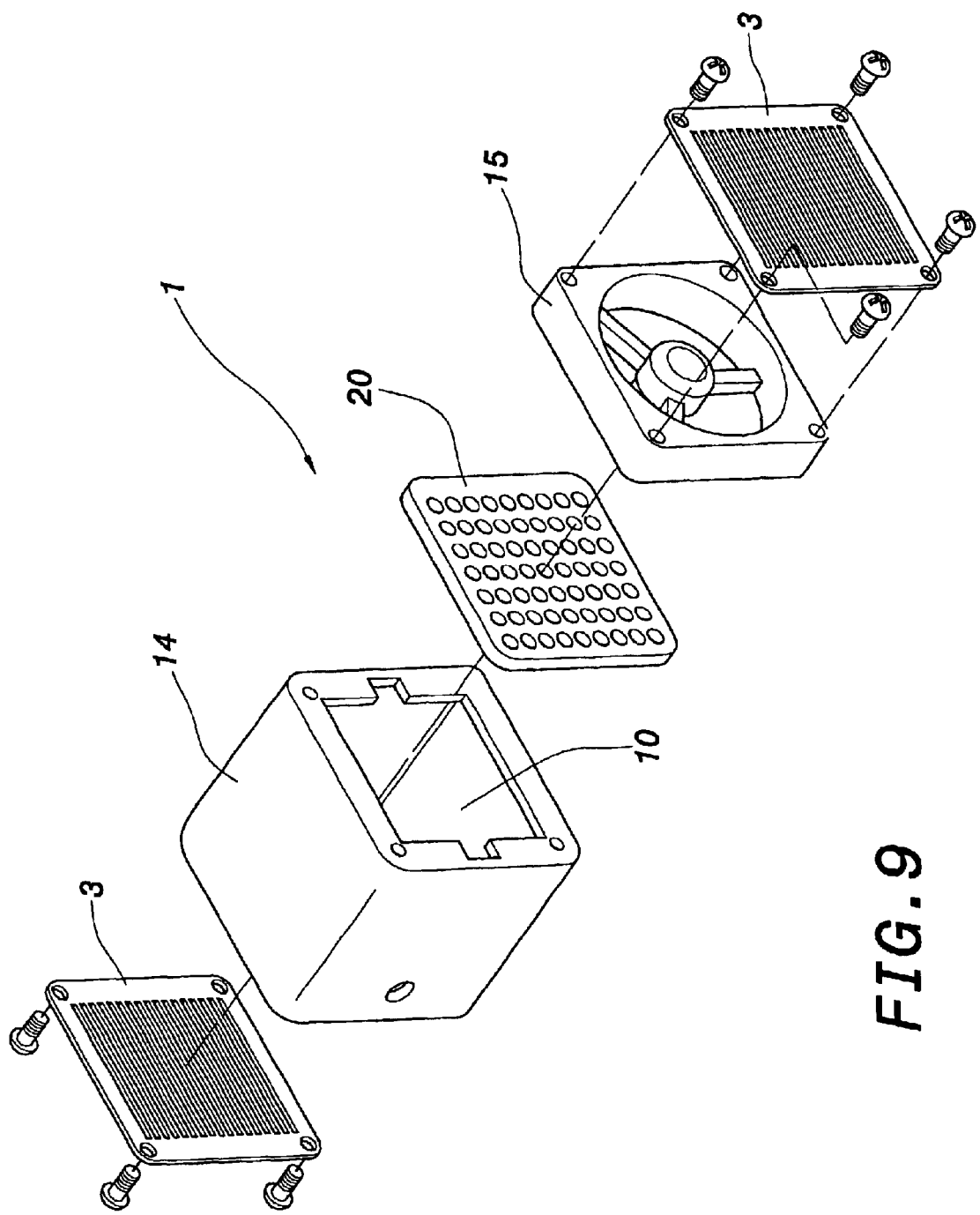
FIG. 9 is an exploded perspective view of a sixth embodiment of the present invention.

As shown in FIGS. 8 and 9, wherein a simpler exhaust device 1 as compared to the third and fourth embodiments is provided. The safety net 3 can be installed at one end of the fan body 14 (as shown in FIG. 8), or the safety nets 3 can be installed at both ends of the fan body 14 (as shown in FIG. 9).

Figure 10:
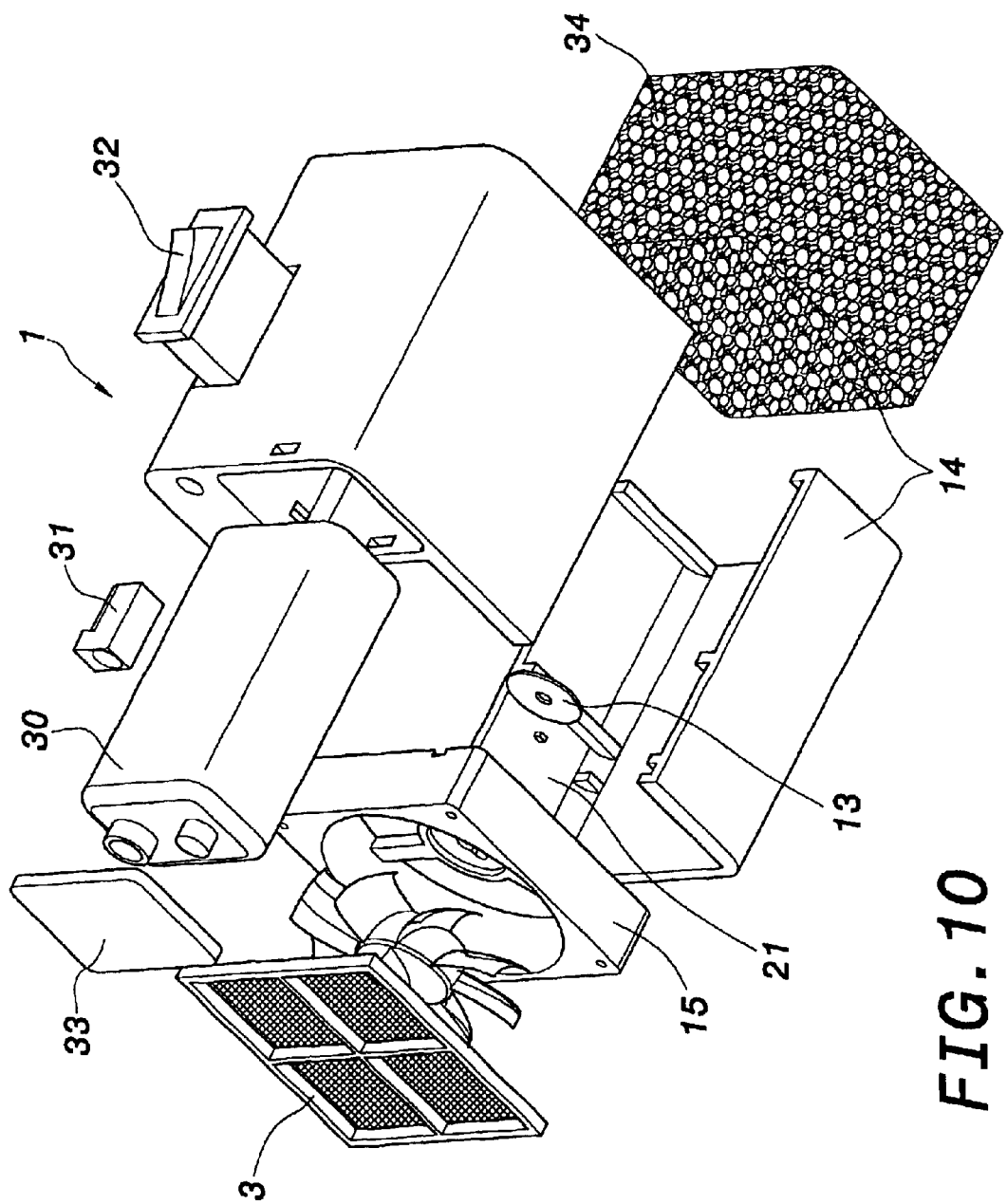
FIG. 10 is an exploded perspective view of a seventh embodiment of the present invention.

As shown in FIG. 10, the fan body 14 of the exhaust device 1 is composed of two half shells. A battery 30, a DC interface 31, a switch 32, and a battery lid 33 are disposed in the fan body 14. The battery lid 33 seals the battery 30 in the left half of the fan body 14. A polyester foam sponge 34 with light catalyst is installed at the rear end of the fan body 14 to filter dusts in air. The light catalyst can kill bacteria, can be restored by illumination of the UV LED 21 for recyclable use, and can be washed with water for enhancing repetitive use rate. The front end of the fan body 14 is roughly identical to the above embodiments and thus will not be further described.

To sum up, the air filter device of the present invention can apply to various kinds of exhaust devices, which are installed in cars, bathrooms, toilets, refrigerators, or computers to continuously provide fresh air for users. Besides, the air filter device of the present invention can also apply to small vertical fans to achieve filtering and sterilizing effects at the same time of reducing ambient temperature.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

What is claimed is:

1. An air filter device for installation on an exhaust device comprising:

A sponge filter being impregnated with a light sensitive catalyst and having at least one ultraviolet light-emitting diode, said sponge filter being disposed at an air passageway of said exhaust device, a fixing insertion slot being formed outside said air passageway of said exhaust device so that said sponge filter can be installed therein, said at least one ultraviolet light-emitting diode being disposed on said exhaust device and being positioned at one side of said sponge filter, said at least one ultraviolet light-emitting diode irradiating air in said air passageway and said sponge filter with ultraviolet light, said ultraviolet light and said light sensitive catalyst eliminating bacteria in said air and in said sponge filter.

2. The air filter device as claimed in claim 1, wherein said exhaust device is selected from the group consisting of an exhaust fan, a heat radiating fan, a cooling fan, and a vertical fan.

3. The air filter device as claimed in claim 1, wherein said ultraviolet light-emitting diode is disposed at an upper or lower edge of said exhaust device.

4. An air filter device for installation on exhaust device comprising:

A sponge filter being impregnated with a light sensitive catalyst and having at least one ultraviolet light-emitting diode, said sponge filter being disposed at an air passageway of said exhaust device, said ultraviolet light-emitting diode is being disposed at a center of a fan blade of said exhaust device and positioned at one side of said sponge filter, said at least one ultraviolet light-emitting diode irradiating air in said air passageway and said sponge filter with ultraviolet light, said ultraviolet light and said light sensitive catalyst eliminating bacteria in said air and in said sponge filter.

5. The air filter device as claimed in claim 4, wherein said exhaust device is selected from the group consisting of an exhaust fan, a heat radiating fan, a cooling fan, and a vertical fan.

6. An air filter device for installation on an exhaust device comprising:

A sponge filter being impregnated with a light sensitive catalyst and having at least one ultraviolet light-emitting diode, said sponge filter being disposed at an air passageway of said exhaust device, said ultraviolet light-emitting diode being fixedly disposed on a PC board of a drive shaft of said exhaust device and positioned at one side of said sponge filter, said at least one ultraviolet light-emitting diode irradiating air in said air passageway and said sponge filter with ultraviolet light, said ultraviolet light and said light sensitive catalyst eliminating bacteria in said air and in said sponge filter.

7. The air filter device as claimed in claim 6, wherein said exhaust device is selected from the group consisting of an exhaust fan, a heat radiating fan, a cooling fan, and a vertical fan.

* * * * *